W. A. GORDON.
MACHINE FOR FORMING STRIPS FOR AUTOMOBILE TIRE TREADS.
APPLICATION FILED FEB. 15, 1916.
1,206,530.
Patented Nov. 28, 1916.
3 SHEETS—SHEET 1.
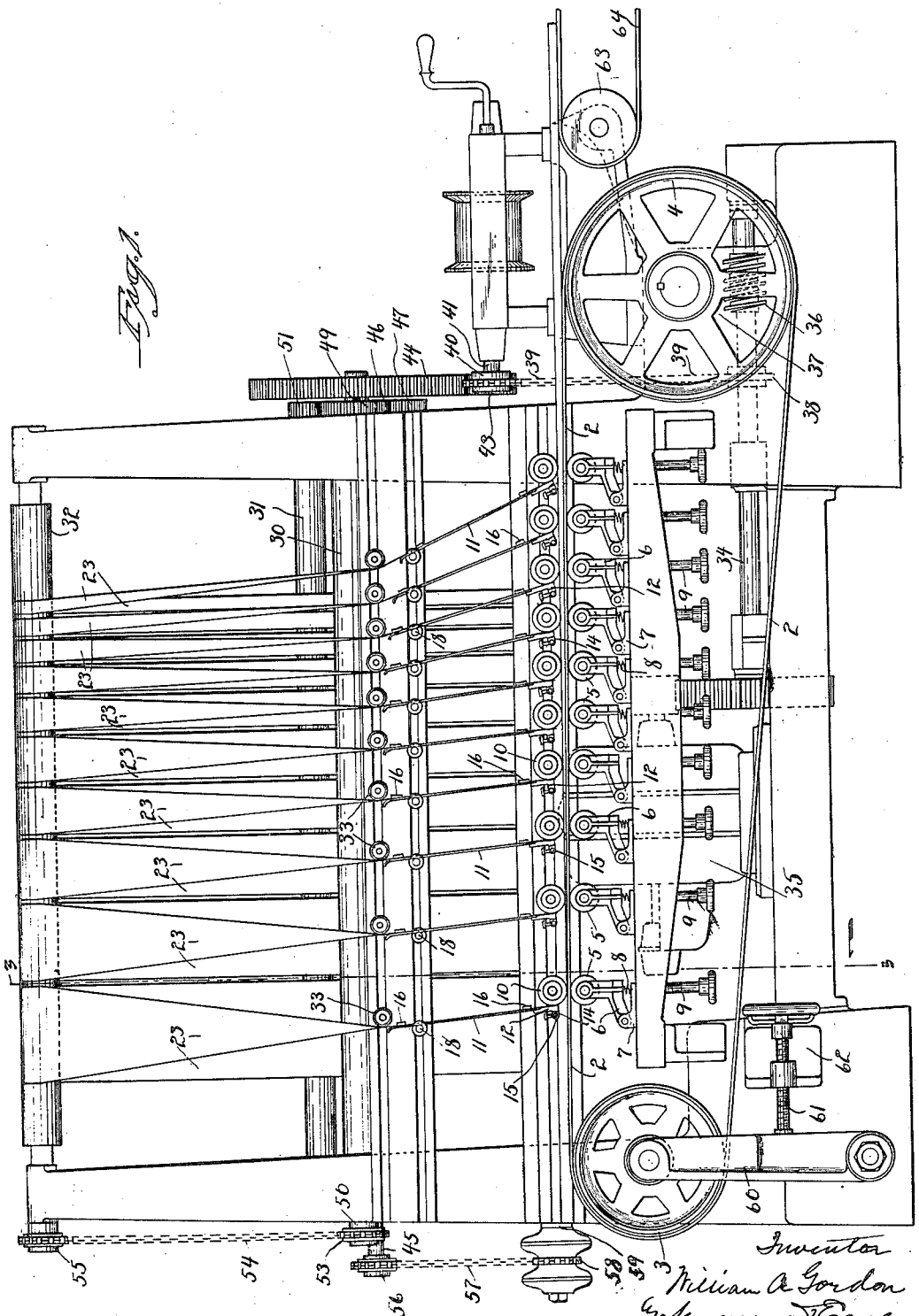

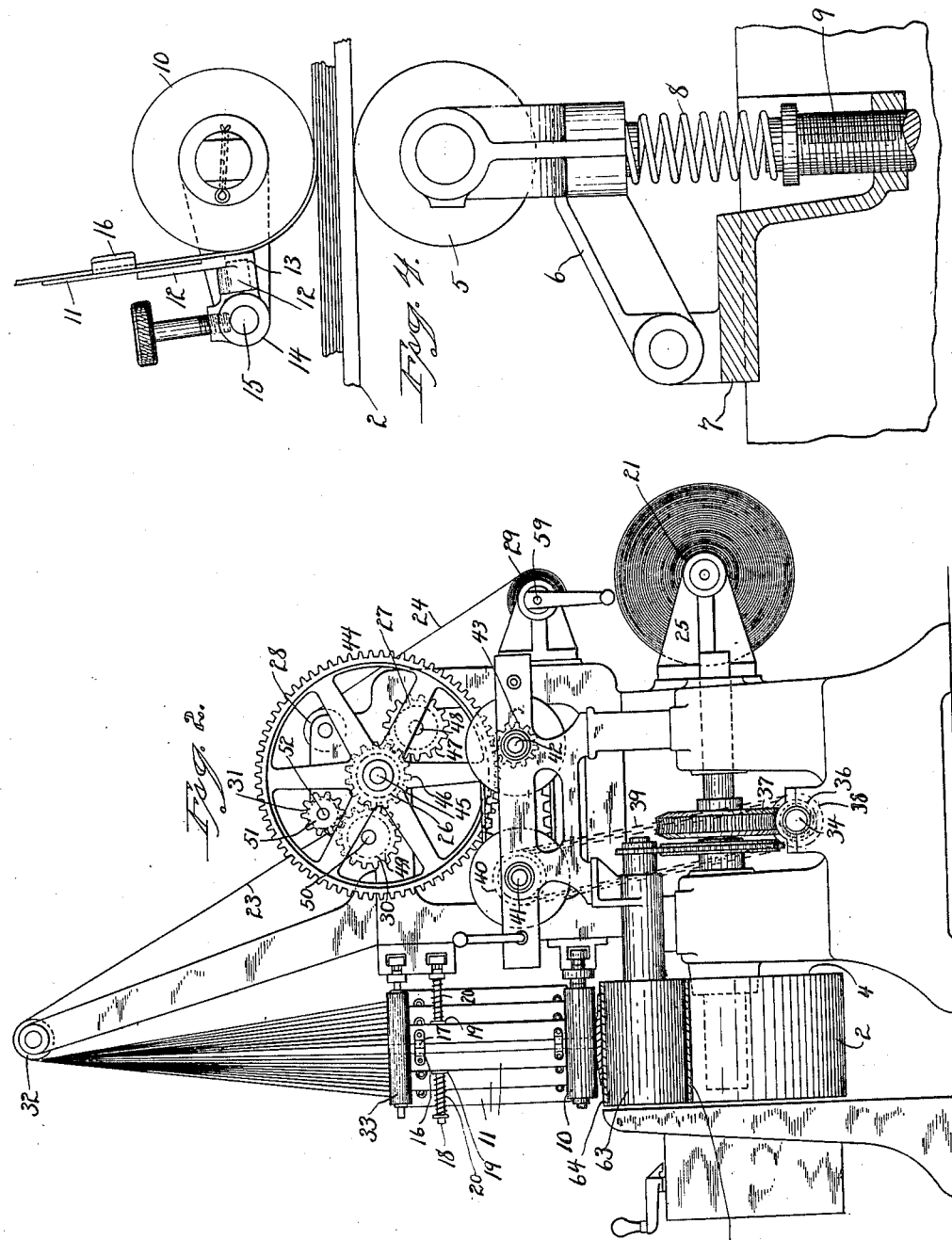

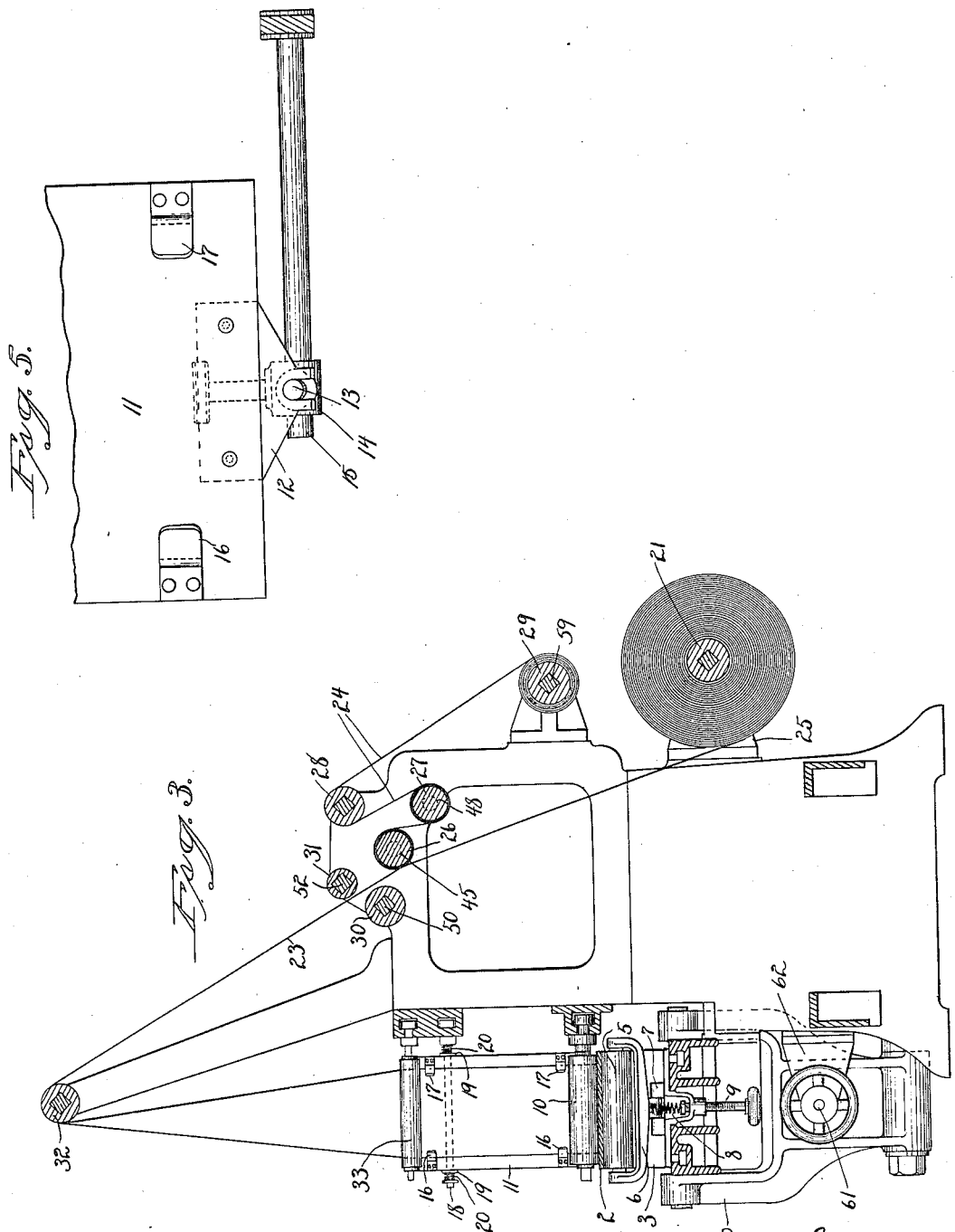

UNITED STATES PATENT OFFICE.

WILLIAM A. GORDON, OF SHELTON, CONNECTICUT, ASSIGNOR TO BIRMINGHAM IRON FOUNDRY, OF DERBY, CONNECTICUT, A CORPORATION.

MACHINE FOR FORMING STRIPS FOR AUTOMOBILE-TIRE TREADS.

1,206,530.

Specification of Letters Patent.

Patented Nov. 28, 1916.

Application filed February 15, 1916. Serial No. 78,417.

*To all whom it may concern:*

Be it known that I, WILLIAM A. GORDON, a citizen of the United States, residing at Shelton, in the county of Fairfield and State of Connecticut, have invented a new and useful Improvement in Machines for Forming Strips for Automobile-Tire Treads; and I do hereby declare the following, when taken in connection with the accompanying drawings and the characters of reference marked thereon, to be a full, clear, and exact description of the same, and which said drawings constitute part of this application, and represent, in—

Figure 1 a view in front elevation of a machine for forming strips for automobile tire treads constructed in accordance with my invention. Fig. 2 an end view of the same. Fig. 3 a sectional view on the line 3—3 of Fig. 1. Fig. 4 a broken sectional view on an enlarged scale showing one of the pressure rolls and its corresponding bearing rolls with connecting parts. Fig. 5 an enlarged face view of the lower end of one of the guide-plates.

This invention relates to an improvement in machines for forming strips for automobile tire treads. These strips are formed in varying lengths and are made up from successive layers of rubber of different widths, superimposed one upon the other with a wide strip for the bottom or base and decreasing in width as they reach the outer surface. These strips are fed from rolls and are led to positions one in advance of the other.

One object of this invention is to provide means for guiding the strips; and further objects are to simplify mechanism for controlling the strips and guiding them one upon the other; and the invention consists in the construction hereinafter described and particularly recited in the claims.

Preferably and as herein shown, the strips are formed upon an apron 2 guided over pulleys 3 and 4. Below the upper run of the apron are a series of pressure rolls 5 each of which is mounted in a frame 6 pivoted to a suitable support 7 and normally forced against the apron by springs 8 the tension of which is adapted to be increased or diminished by screws 9. Above the upper run of the apron and corresponding in number to the supporting rolls are a series of bearing rolls 10 which are arranged in different planes so as to stand at slightly increasing elevation from the plane of the apron. At the rear of each bearing roll is a guide-plate 11. These are supported by providing at their lower ends pivoting yokes 12 which set over studs 13 projecting outward from hubs 14 mounted on rods 15 extending parallel with and just in rear of the bearing rolls 10. Each guide-plate is provided on opposite sides at top and bottom with guiding-fingers 16 and 17. The upper ends of these plates bear against outwardly projecting rods 18 on which washers 19 are mounted to bear upon opposite sides of the plate and these washers are forced against the sides of the plate by springs 20, these tending to center the upper end of the guide-plates but permitting it to yield as may be required. Rubber as it comes from the calendar, will be cut into strips of varying widths and wound upon a roller 21 with strips of lining or wrapper so that the convolutions of the rubber will not adhere. The roll 21 with a series of strips of different widths each comprising strips of rubber 23 and wrapper 24, will be hung by brackets 25 projecting outward from the rear of the machine frame. The strips of rubber and wrapper pass a driven roll 26 over which the wrapper passes around another driven roll 27 over an idler 28 to a take-up roll 29; while the strips of rubber 23 pass upward between rolls 30 and 31 over a supporting roll 32, downward over turning rolls 33 by which the plane of the strips is turned at right angles into the plane of the bearing-rolls under which the strips pass onto the apron. The mechanism is driven from a driving shaft 34 which may be driven from an electric motor 35, or from any other source of power. This driving shaft has a worm 36 meshing with a worm gear 37 which drives the pulley 4 by which the apron is moved. On the shaft 34 is a sprocket wheel 38 connected by a chain 39 with a sprocket wheel 40 on a driven shaft 41 of a variable speed mechanism, which, as here illustrated, is of the Reeves type. The complementary shaft 42 of the variable speed mechanism, carries a pinion 43 meshing with a gear 44 on the driving shaft 45 of the roll 26. On the shaft 45 is a pinion 46 meshing with a pinion 47 on the shaft 48 of the roll 27, and with a pinion 49 on the shaft 50 of the roll 30 which in turn meshes with a pinion 51 on the shaft 52 of the roll 31 which is geared to have a slightly greater surface speed than either the rolls 26, 27 or feed roll 30. On the opposite end of the shaft 50 is a sprocket wheel 53 connected by a sprocket chain 54 with a sprocket 55 on the shaft of the supporting roll 32. On the shaft 45 is a sprocket 56 connected by a chain 57 with a sprocket 58 on the shaft 59 of the take-up roll 29. The supporting pulley 3 for the apron is mounted in the upper end of a yoke 60 which is adapted to be moved by a screw 61 suitably mounted in a bracket 62 so that the yoke can be swung in one direction or the other as required to regulate the tension of the apron. At the opposite end of the apron is a driven pulley 63 from which a conveyer belt 64 passes by which the finished product is delivered from the machine.

Referring to Fig. 1 of the drawings, it will be noted that the strips 23 vary in width, the widest being at the left. This I will refer to as the first strip which, as it passes down, rests upon the upper surface of the apron. The second strip is superimposed upon the first strip, and the roller beneath it will crowd it onto the first strip, the guide-plates directing it in the proper direction. The guides being centrally pivoted at their lower end, are fixed at that point, while their upper ends are free to yield slightly as may be necessary to accommodate themselves to the direction of the movement of the rubber strips over them. The natural tendency, therefore, is to gradually work the strips into their predetermined position with relation to the finished product. The third strip is superimposed upon the surface of the second strip and caused to adhere thereto by the pressure rolls, and so on until the strip is completed as it passes beneath the last bearing roll. An advantage of having the pressure roll beneath the belt is that they are more readily adjusted; and as they are under spring tension they will yield in case the hand of an operator should be caught between them and the apron, or beneath the bearing rolls. By the use of a variable speed mechanism the relative speed between the movement of the apron and the stripper mechanism which comprises the several rolls 26, 27 and 28, 30 and 31, may be readily controlled so that the tension on the strips as they are delivered to the apron may be varied to take up the slack as it occurs by the stretching of the rubber. The accelerating roll 31 moving at a greater surface speed than the roll 26, tends to draw the rubber away from the wrapper should there be any tendency to adhere.

I claim:—

1. In a machine for working stock material comprising strips of rubber and wrapper, the combination with a wrapper roll over which the wrapper is drawn, a supporting roll over which the rubber is drawn, means for driving said rolls, and an accelerating roll between the wrapper roll and the supporting roll adapted to be engaged by the strip of rubber, if the rubber adheres to the wrapper, and means for driving the accelerating roll faster than the wrapper roll.

2. In a machine for forming strips of material for automobile tire treads from rolls of rubber alternating with rolls of wrapper, means for stripping the wrapper from the rubber, bearing-rolls beneath which the strips pass, a moving bearing surface upon which the strips are laid, means for driving said bearing-surface, and a variable-speed mechanism between the moving bearing-surface and the stripper mechanism.

3. In a machine for forming strips of material for automobile tire treads from rolls of stock material comprising strips of rubber and wrapper, means for stripping the wrapper from the rubber, bearing-rolls beneath which the strips pass, guide-plates in rear of said bearing rolls, a moving bearing-surface upon which the strips are laid, means for driving said bearing surface, and a variable speed mechanism between the moving bearing surface and the stripper mechanism.

4. In a machine for forming strips of material for automobile tire treads from rolls of rubber, including bearing rolls beneath which the strips pass, a moving bearing surface upon which the strips are laid, means for driving said bearing surface, and adjustable yielding pressure rolls below the said bearing surface, and upon which it rests.

5. A machine for forming strips for automobile tire treads provided with a series of bearing-rolls, and a guide-plate in rear of each roll and projecting above said rolls.

6. A machine for forming strips for automobile tire treads provided with a series of bearing-rolls, and a guide-plate in rear of each roll and projecting above said bearing rolls, said guide-plates centrally supported at their lower ends.

7. A machine for forming strips for automobile tire treads provided with a series of bearing-rolls, and a guide plate in rear of each roll and projecting above said bearing rolls, said guide-plates centrally supported at their lower ends and provided on opposite sides with guide-fingers.

8. A machine for forming strips for automobile tire treads provided with a series of bearing-rolls, and a guide-plate in rear of each roll, said guide-plates centrally supported at their lower ends and yieldingly held at their upper ends.

WILLIAM A. GORDON.